(12) United States Patent
Hall et al.

(10) Patent No.: US 11,288,243 B2
(45) Date of Patent: *Mar. 29, 2022

(54) SYSTEMS AND METHODS FOR ASSESSING DATA QUALITY

(71) Applicant: MASTERCARD INTERNATIONAL INCORPORATED, Purchase, NY (US)

(72) Inventors: Cristina Irene Hall, Hillsboro, MO (US); Robert Brent Gardner, High Ridge, MO (US); William Curtis Jones, O'Fallon, IL (US); Charles E. Wheeler, St. Louis, MO (US); Brian L. Wetter, Ballwin, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 327 days.

This patent is subject to a terminal disclaimer.

(21) Appl. No.: 16/422,609

(22) Filed: May 24, 2019

(65) Prior Publication Data

US 2019/0286621 A1 Sep. 19, 2019

Related U.S. Application Data

(63) Continuation of application No. 15/333,283, filed on Oct. 25, 2016, now Pat. No. 10,318,501.

(51) Int. Cl.
*G06F 16/215* (2019.01)
(52) U.S. Cl.
CPC ................... *G06F 16/215* (2019.01)

(58) Field of Classification Search
CPC .................................................... G06F 16/215
See application file for complete search history.

(56) References Cited

U.S. PATENT DOCUMENTS

| | | |
|---|---|---|
| 8,892,534 B2 | 11/2014 | Hamlescher et al. |
| 8,984,360 B2 | 3/2015 | Al Za'Noun et al. |
| 9,082,076 B2 | 7/2015 | Miranda et al. |
| 9,152,662 B2 | 10/2015 | Bhide et al. |
| 9,158,805 B1 | 10/2015 | Kalki et al. |
| 2008/0250057 A1 | 10/2008 | Rothstein et al. |
| 2010/0023515 A1 | 1/2010 | Marx |
| 2010/0070500 A1 | 3/2010 | Cui et al. |
| 2014/0365406 A1* | 12/2014 | Miller ............. G06Q 10/00 706/11 |
| 2015/0074053 A1 | 3/2015 | Sarferaz |
| 2015/0339360 A1 | 11/2015 | Nelke et al. |
| 2016/0070724 A1 | 3/2016 | Marrelli et al. |
| 2017/0116295 A1* | 4/2017 | Wan ................ G06F 16/254 |

* cited by examiner

*Primary Examiner* — Truong V Vo
(74) *Attorney, Agent, or Firm* — Armstrong Teasdale LLP

(57) ABSTRACT

A computer-implemented method for assessing data quality of one or more data records. The method is implemented using a quality assessment (QA) computing device. The method includes storing, into a data warehouse, predefined data quality assessment criteria to be applied to the one or more data records to assess the data quality of the one or more data records. The method further includes assessing, by the QA computing device, the one or more data fields of each data record in the one or more views using the assessment criteria, wherein a data quality value is assigned to the one or more data fields based on the data quality.

20 Claims, 5 Drawing Sheets

SYSTEMS AND METHODS FOR ASSESSING DATA QUALITY

CROSS REFERENCE TO RELATED APPLICATIONS

This application is a continuation application of U.S. patent application Ser. No. 15/333,283, filed Oct. 25, 2016, entitled "SYSTEMS AND METHODS FOR ASSESSING DATA QUALITY", the disclosure of which is incorporated herein by reference in its entirety.

BACKGROUND

The field of the invention relates generally to databases, and more particularly, to a network-based system and method for assessing the quality of data included within data records.

At least some known merchants and retailers generate and provide data records that can be used for business purposes. The data records are often provided in an accepted format according to an accepted criteria. Occasionally the data records vary in compliance with the accepted criteria. For example, some data records are of good quality and contain complete and accurate information, while some data records are of poor quality and contain missing or incorrect information. Poor quality data records may be less suitable to be used for business purposes and/or technical purposes, including further data processing. Poor quality data may generate increased errors and/or distort analytics on the data set. Further, if low quality data is unknowingly used as input for a computing device, unexpected computational behavior may occur and/or errors may be produced that are difficult to identify.

At least some known systems attempt to assess the quality of data records in a serialized sequence. For example, many known systems require a programmer to script a flow of data into sub-programs in a serialized (single processor) fashion. Additionally, these known systems may be inefficient at processing high volumes of data records. For example, the processing time for knowns systems may grow exponentially over an increasing data set. Therefore, an enhanced quality assessment system is needed that addresses these problems.

BRIEF DESCRIPTION OF THE DISCLOSURE

A quality assessment (QA) computing device for assessing data quality of one or more data records is provided. The QA computing device includes one or more processors, an assessment engine, and a data warehouse. The QA computing device is configured to store, in the data warehouse, predefined metadata identifying the one or more data records to be scored and points to be awarded based on the scoring. The QA computing device is also configured to retrieve a source table including the one or more data records, wherein each data record includes one or more data fields. The QA computing device is further configured to generate a staging table including the one or more data records. The QA computing device is also configured to create one or more views of the staging table, wherein the views include the one or more data records. The QA computing device is further configured to generate, by the assessment engine, predefined data quality assessment criteria from the predefined metadata to be applied to one or more data records for assessing data quality of the one or more data records. The QA computing device is also configured to assess, by the assessment engine, the data quality of the data fields of the data records included in the views by applying the data quality assessment criteria. The QA computing device is further configured to assign, by the an assessment engine, a data quality value to at least one data field in the one or more data records based on the assessed data quality.

A computer-implemented method for assessing data quality of one or more data records is provided. The method is implemented by a quality assessment (QA) computing device including one or more processors, an assessment engine, and a data warehouse. The method includes storing, in the data warehouse, predefined metadata identifying the one or more data records to be scored and points to be awarded based on the scoring. The method also includes receiving a source table including the one or more data records, wherein each data record includes one or more data fields. The method further includes generating a staging table including the one or more data records. The method also includes creating one or more views of the staging table, wherein the views include the one or more data records. The method further includes generating, by the assessment engine, predefined data quality assessment criteria from the predefined metadata to be applied to one or more data records for assessing data quality of the one or more data records. The method also includes assessing, by the assessment engine, the data quality of the data fields of the data records included in the views by applying the data quality assessment criteria. The method further includes assigning, by the assessment engine, a data quality value to at least one data field in the one or more data records based on the assessed data quality.

A non-transitory computer readable storage media having computer-executable instructions embodied thereon is provided. When executed by at least one processor, the computer-executable instructions cause the at least one processor to store, in a data warehouse, predefined metadata identifying one or more data records to be scored and points to be awarded based on the scoring. The computer-executable instructions also cause the at least one processor to retrieve a source table including the one or more data records. Each data record includes one or more data fields. The computer-executable instructions further cause the at least one processor to generate, a staging table including one or more data records. The computer-executable instructions also cause the at least one processor to create one or more views of the staging table. The views include the one or more data records. The computer-executable instructions further cause the at least one processor to generate predefined data quality assessment criteria from the predefined metadata to be applied to one or more data records for assessing data quality of the one or more data records. The computer-executable instructions also cause the at least one processor to assess, the data quality of the data fields of the data records included in the views by applying the data quality assessment criteria. The computer-executable instructions further cause the at least one processor to assign a data quality value to at least one data field in the one or more data records based on the assessed data quality.

BRIEF DESCRIPTION OF THE DRAWINGS

FIG. 1 is a simplified block diagram of an example system used for assessing data quality of data records.

FIG. 2 illustrates an example configuration of a computing device of a client system shown in FIG. 1, in accordance with one embodiment of the present disclosure.

FIG. 3 illustrates an example configuration of a quality assessment (QA) computing device shown in FIG. 1, in accordance with one embodiment of the present disclosure.

FIG. 4 is a flow chart of a process for assessing data records using the QA computing device shown in FIG. 1.

FIG. 5 is a diagram of components of one or more example computing devices that may be used in the system shown in FIG. 1.

DETAILED DESCRIPTION

Figure 1:
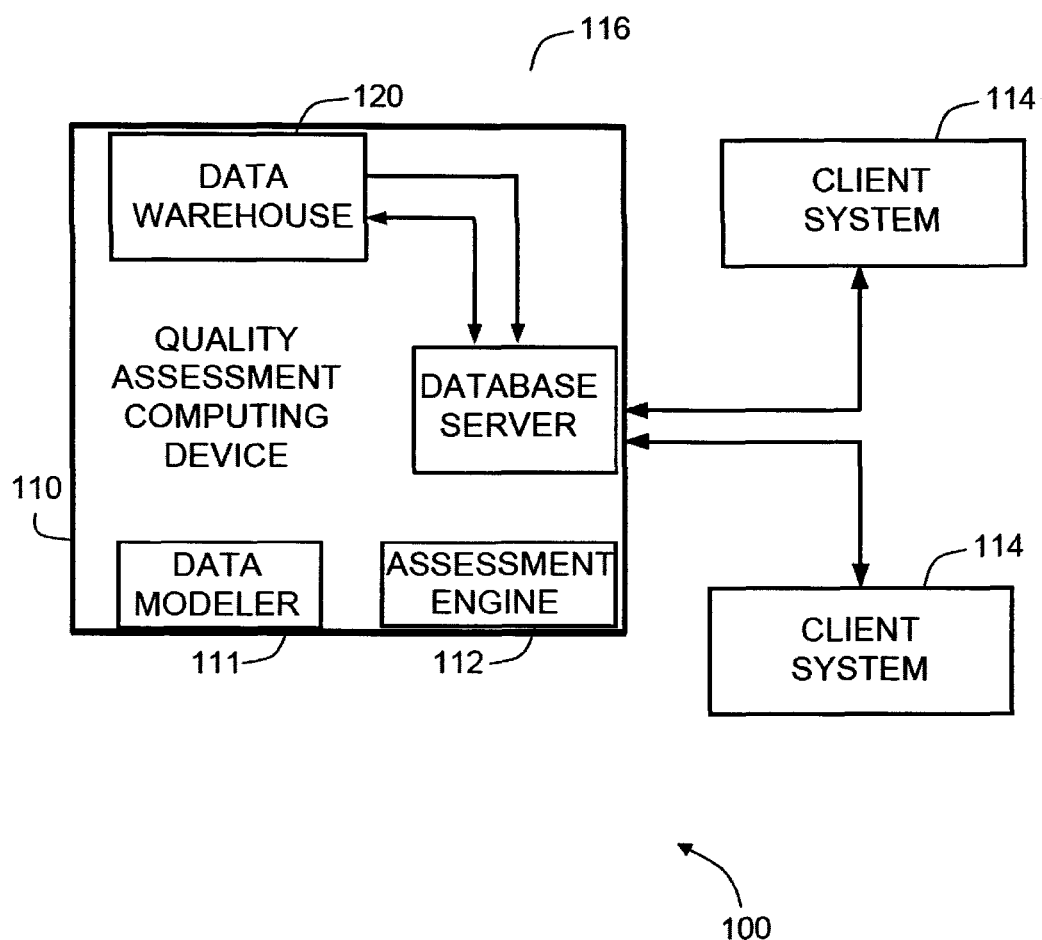
FIGS. 1-5 show example embodiments of the methods and systems described herein.

Described herein is an enhanced data record quality assessment (QA) system that assesses data records for data quality based on predefined data quality assessment criteria. Data quality may vary based on, but not limited to, the completeness and correctness of the data records. The system includes a quality assessment (QA) computing device that includes at least one processor, a memory, and a data warehouse. The QA computing device further includes a data modeler and an assessment engine. In some embodiments, the at least one processor, the memory, the data modeler and/or the assessment engine are located inside the data warehouse and use in-database processing to assess the data records. The QA computing device assesses the data records using data quality assessment criteria. The QA computing device determines a record assessment score for each data record based on data quality. In some embodiments, the record assessment scores for the data records may be determined in parallel. The record assessment score of the data records may also be aggregated to determine a record assessment score for a particular data field.

Known data quality scoring systems require application servers located remotely (i.e., outside) of a database that stores data records to be scored. The data records must be transmitted to an outside application server over a network connection, thereby constraining the rate at which data can be scored and exposing the data records to interception by other processes. In the example embodiment, the enhanced data record QA system utilizes an assessment engine system that resides inside the database system (i.e., a data warehouse) that stores the data records to be scored. Therefore, the full input/output bandwidth and the parallel query capacity of the database system, further described below, can be used to score the data records. The result is that the enhanced data record QA system is faster and more secure than prior known implementations of data quality scoring systems.

Furthermore, known data quality scoring systems use procedural programming languages to "program" an evaluation of the data quality of data records. In contrast, the enhanced data record QA system uses a "set based" paradigm for scoring data records that enables a user to define the tables, fields, points, and scoring rules in any order or organization to represent a scoring scheme for data records. As a result, the scoring scheme described by the data is easy to read and modify by a non-programmer. The assessment engine then handles the input and output of the assessment process.

In the example embodiment, data quality assessment of data records is performed in four stages: a metadata entry stage, a data receipt stage, and an execution stage. During the metadata entry stage, a user defines the data quality assessment criteria by entering metadata used by the assessment engine for the data quality assessment. During the data receipt stage, the enhanced data record QA system receives data records for scoring. During the execution stage, the data modeler prepares the data records for data quality assessment. The assessment engine creates data quality assessment criteria from the metadata and applies the data quality assessment criteria to the data records, resulting in record assessment score for each data record based on data quality.

Metadata Entry Stage

The QA system enables a user to define the data quality assessment criteria by entering a multitude of metadata used for data quality assessment of the data records. The user enters the metadata into a series of tables. The tables are stored into the memory and/or the data warehouse. The user may enter the metadata into the QA computing device or into a remote computing device in communication with the QA computing device. The user defines the following metadata:

i. The user defines a table name of a table that includes the data records to be assessed, also known as a source table. The source table is typically transmitted by an entity, such as a merchant or vendor.
  ii. The user defines a field name of a data field in the source table (defined in "table name") that is eligible to be assessed. The user may define more than one field name.
  iii. The user defines a source name of a view of a staging table that is read to perform a data assessment, and names of data fields in the view. A view is used to transform data in the staging table without corrupting the data in the staging table. The user may define more than one source name, enabling different views to be utilized with the data in the staging table.
  iv. The user defines a point name of a point that can be awarded to a data field (defined in "field name"). The user may define more than one point name.
  v. The user defines a rule that describes how a pass/fail data quality test is to be performed on the data field. A passing test results in awarding points based on the quality of the data. The rule contains a literal value and one of eight different operators (defined below):
    a. RX—Regular Expression equality—the content of the field matches the pattern of the literal value in the rule.
    b. NX—Regular Expression inequality—the content of the field does not match the pattern of the literal value in the rule.
    c. LT—Less Than—the content of the field sorts to a lower position than the literal value in the rule.
    d. LE—Less Than or Equal—The content of the field matches or sorts to a lower position than the literal value in the rule.
    e. EQ—Equality—The content of the field matches the literal value in the rule.
    f. GE—Greater Than or Equal—The content of the field matches or sorts to a higher position than the literal value in the rule.
    g. GT—Greater Than—the content of the field sorts to a higher position than the literal value in the rule.
    h. NE—Not Equal—the content of the field does not match the literal value in the rule.

Based on the metadata predefined by the user, the assessment engine generates one or more data quality assessment criteria. Each data quality assessment criteria combines at least a point, a rule, and a source name to describe a criteria that must be true for a point to be awarded. Many criteria may be required for a single point.

The data quality assessment criteria reduces the amount of software developer time needed to write different data quality assessments of data records by turning the data records assessment into a data driven activity. The data quality assessment criteria are created and stored in a database and can be applied repeatedly to different data fields. In addition, the rules can be combined into different arrangements of data quality assessment criteria for different scoring schemes.

Data Receipt Stage

In the example embodiment, an entity, such as a merchant or vendor, transmits a source table including one or more data records to the QA computing device. A data record is composed of one or more data fields. The source table is a collection of related data held in a structured format within a database. In one embodiment, the source table is stored in a data warehouse.

In the example embodiment, the data records are transmitted direct to the data warehouse and the data quality assessment of the data records occur in the data warehouse, for example, using in-database processing. In an alternative embodiment, the QA computing device is in communication with the data warehouse in order to transfer data records to, or receive data records from, the data warehouse. In such an embodiment, the data quality assessment may occur outside the data warehouse. For example, the QA computing device performs the data quality assessment on the one or more data records before transmitting the one or more data records to the data warehouse. In further embodiments, whether the QA computing device transmits the one or more data records to the data warehouse depends on the data quality assessment: the QA computing device transmits high quality data records (for example, data records that meet or exceed a predefined record assessment score) and rejects low quality data records (for example, data records that fall below a predefined record assessment score). In still further embodiments, data records of different quality may be stored separately from each other, for example in different databases or different partitions (e.g., a first database and a second database).

Execution Stage

As explained in detail below, the assessment engine processes data records for quality assessment by fetching data records from the source table for scoring, evaluating at least some of the data quality assessment criteria for validity, generating an "insert into all" statement containing sourcing sources and the data quality assessment criteria, storing a record in a criteria results tables for every record that was scored, aggregating passing criteria to a record/points awarded table, and aggregating points awarded to a record total score table. A configuration of the assessment engine enables additions and modifications to any of the four steps with no programming necessary. In one embodiment, the assessment engine is executed in a parallelized operation.

In order to prepare the one or more data records for quality assessment, the data modeler copies a table structure of the source table into a new staging table. The assessment engine executes a database code package, written in a database procedural language (i.e., Oracle PL/SQL, Postgres PL/SQL, etc.) and registered in an operation table of the assessment engine. The code package initiates the assessment engine to begin scoring the data records. The assessment engine adds two data fields (i.e., two columns) to the staging table for (1) a movement identification (ID) identifying an execution of an assessment engine that copied and scored the data records, and (2) a record identification (ID) that represents a unique serial number for each data record to uniquely identify a version of a data record being scored. Since a data field may be updated, and the assessment engine may score different versions of the same data at different times, the record ID is used to identify a version of the data record scored. The staging table is identical to the source table in structure except for an addition of the movement ID field and the record ID field for each data record.

The assessment engine creates one or more views of the staging table that incorporate "join" clauses with reference model data from a reference table. The reference model data includes data values that are known to be valid. The assessment engine uses "join" clauses to compare the reference model data fields to the staging table data fields and return valid data to a new reference data field. More specifically, the assessment engine generates a view to collate (using a "join" clause) a data field in the reference table with a corresponding data field in the staging table to create a new reference data field that contains a copy of a matching data field. The assessment engine performs this comparison for each data record. A data record in the staging table that includes a data field that does not match a corresponding data field in the reference table receives a null value in the reference column. For example, the reference model data may include valid airport codes (i.e., STL for St. Louis Lambert International, YYZ for Toronto Pearson International, etc.) or U.S. telephone area codes, or any other "non-algorithmic" set defining what is valid, and by exclusion, what is not valid. For example, if the reference model data contains an airport code data field that includes "STL" and a data record in the staging table includes a corresponding airport code data field that includes "STL," the reference data field created in the view for the data record will include the matching data field (i.e., "STL"). Conversely, if the reference model data contains "STL" and the data record includes "YYZ," the reference data field for the data record will contain null.

The database code package further initiates the assessment engine to assess the table name associated with the staging table view. When the data assessment is initiated, the assessment engine builds a list of data sources defined for the table. A data source is the source (i.e., location) of the data and provides the technical information needed to access the data. For each source, the assessment engine builds a list of data quality assessment criteria using the predefined metadata. For example, the assessment engine converts the predefined metadata into SQL code that can run in the database, usually in a stored procedure.

In some embodiments, the assessment engine further compares the data sources and the data field names against a database catalog for validity, logging unknown sources and unknown data field names that the assessment engine cannot verify as being exempt from the assessment process. The database catalog includes a list of all tables and views in the database, and describes the names and types of their fields. Before executing the pass/fail data quality tests, the assessment engine verifies that all of the criteria refer to valid data fields in the database. More specifically, the assessment engine compares the data quality assessment criteria to the database catalog to verify that the data quality assessment criteria refer to valid data fields. For example, if the assessment engine is configured to award a point every time the data field "foo.bar"="YES" and the data field "foo.bar" does not exist in the database, any automated attempt to evaluate that criteria would fail. The assessment engine logs invalid criteria and data fields that cannot be verified as valid. The assessment engine then proceeds to evaluate the valid criteria.

In additional embodiments, the assessment engine checks the source table names, data fields, and data quality assessment criteria expressions for potentially malicious expressions (i.e., SQL injection characteristics). The assessment engine logs potentially malicious expressions as invalid and exempts the potentially malicious expressions from the assessment process.

In some embodiments, the assessment engine builds for each source a parallelized load query (for example, "Insert all into score_result select <criteria True/False expression1> from source into score_result select <criteria True/False expression2> from source . . . into score_result select <criteria True/False expressionn> from source;"). The parallelized load query is configured such that multiple data quality assessment criteria are processed together and the quality of data records may be assessed in parallel. This may include, at least one of (i) applying at least two data quality assessment criteria to a single data record in parallel, or (ii) independently assessing at least two data records in parallel. Parallelizing the query has the technical effect of reducing processing time since the assessment engine scores the data records in a single pass. Every test applicable to every data record is executed in a "set" fashion across all the query processors available, in potentially thousands of simultaneous threads. This enables the data assessment engine to be more scalable to bring in large quantities of data records and to apply a selectable set of rules to the data records in a highly parallelized environment. As used herein, "in parallel" refers to independent actions performed at substantially the same time.

The bulk type data processing that is built into the enhanced data record QA system is configured to evaluate the data records as simultaneously as possible. The system generates code within a database process that uses the technique "insert into all" that treats each criteria separately and runs them all in a parallel process instead of making several passes through the data. The system performs one read of the source data and one write of the output on the back end. In some embodiments, the enhanced data record QA system also uses in-database processing such that at least the assessment engine is located within the data warehouse. This provides performance improvements by avoiding the requirement to move the data out of the database into a separate analytics environment for processing, and then back to the database. The assessment engine assesses the one or more data records by executing the load query and assigning a numeric value (also known as points) to each data field based on data quality. In some embodiments, the assessment engine further logs duration of the execution, a number of data records loaded, and any errors encountered. The assessment engine then aggregates the assigned values by data field and/or by data record. More specifically, in one embodiment, the assessment engine aggregates the values assigned to a data field for the one or more data records to determine a total data quality assessment score for the data field. In another embodiment, the assessment engine aggregates the values assigned to each data field for a data record to determine a total data quality assessment score for the data record.

In some embodiments, the assessment engine compares a data quality assessment score for a data field to a predefined metric parameter to determine the quality of the data field. In additional embodiments, the assessment engine compares a data quality assessment score for a data record to a predefined metric to determine the quality of the data record. For example, the predefined metric parameter may define a high quality data record as a data record receiving a data quality assessment score of at least 10. If the data quality assessment score awarded to a data record is 11, the assessment engine determines that the data record is high quality.

In alternative embodiments, the assessment engine assigns an alphabetic value to each data field and/or by data record based on the data quality (i.e., "A" for good quality, "B" for average quality, etc.). The assessment engine then determines an average alphabetic value awarded by data field and/or by data record.

In some embodiments, whether the QA computing device transmits the one or more data records to the data warehouse depends on the data quality assessment: the QA computing device transmits high quality data records (for example, data records that receive at least a predefined minimum amount of points) and rejects low quality data records (for example, data records that do not receive at least a predefined minimum amount of points). In still further embodiments, data records of different quality may be stored separately from each other, for example, in different databases or different partitions.

EXAMPLE IMPLEMENTATION

Described herein is an example implementation of assessing data quality using the QA system described above. Scoring the data records includes steps for setting up the assessment engine, as described herein, including tables and data fields to be scored, identifying a source of the tables (i.e., views of the data to be queried), identifying points that may be awarded to each data field, and identifying a data quality assessment criteria that must be met to award a point.

During a metadata entry stage, a user defines data quality assessment criteria by entering a multitude of metadata used for data quality assessment of the data records, as described above. During a data receipt stage, an entity, such as a merchant or vendor, transmits a source table including data records to the QA computing device. In the example implementation, the data records are an airline passenger transportation detail addendum from a credit card transaction. Each data record includes the following data fields described below: a ticket source ID, a ticket number, a merchant business code, and a date. Quality of the data fields is scored on a trinary scale: zero points are awarded if the field is blank, one point is awarded if the data field contains any data, and two points are awarded if the data field passes a predefined number of tests.

The criterion for a correctly formed ticket number is as follows:
i. If a merchant business code of the merchant is between 3000 and 3299, the ticket number must be 13 to 15 digits with optional trailing spaces allowed and the first three digits must match a valid carrier number from a reference table.
ii. If the merchant business code of the merchant is 4511, the ticket number must be 6 or more digits.

An example definition for the source table appears as follows:

| Field Name | Data Type | Note |
| --- | --- | --- |
| TICKET_SOURCE_ID | number(22, 0) | This is a unique serial number for the ticket. Each record in the table has a unique value in this field. This value is used as a primary identifier for each record in the table |
| TCKT_NUM | varchar2(20) | This is a valid ticket number for the ticket. |

-continued

| Field Name | Data Type | Note |
|---|---|---|
| MERCH_BUS_CD | number(4, 0) | This is a four digit number that identifies an airline that issued the ticket. |
| LAST_MOD_DTTM | Date | This is a time stamp that is updated with the current system date when a record is created or updated. It can be used to determine which records have been added or changed since a reference date. In the example embodiment, instead of assessing every record in the table every time, the assessment engine can copy and score only the records that have been added or updated since the last time an assessment was executed. |

The source table, named "TICKET_SOURCE," includes four data records, although in alternative embodiments the source table may contain many more data records. In one embodiment, the source table appears as follows:

| TICKET_SOURCE_ID | TCKT_NUM | MERCH_BUS_CD | LAST_MOD_DTTM |
|---|---|---|---|
| 1 | "" | 3105 | Today |
| 2 | "garbage" | 3092 | Today |
| 3 | "503123456789012" | 3047 | Today |
| 4 | "123456" | 4511 | Today |

The reference table, named "CARRIER" and stored in a memory and/or the data warehouse, contains valid carrier numbers. If the ticket number is 13 to 15 digits, the first three digits of the ticket number must match a valid carrier number from the reference table. An exemplary definition for the reference table is as follows:

| Field Name | Data Type | Note |
|---|---|---|
| CARRIER_NUM | varchar2(3) | Contains a valid 3 digit carriernumber |
| CARRIER_NAME | varchar2(40) | Contains a name of an airline carrier associated with the carrier number |

The reference table includes only one carrier number data record for simplicity. In one embodiment, the reference table appears as follows:

| CARRIER_NUM | CARRIER_NAME |
|---|---|
| 503 | "PanUniverse Airlines" |

The data modeler generates (with the help of a code generating engine) a staging table named "STG_TICKET" to hold a copy of the data records to be scored from the source table. The assessment engine then executes a database code package, written in a database procedural language (i.e., Oracle PL/SQL, Postgres PL/SQL, etc.), to initiate the assessment engine to begin scoring the data records. The assessment engine adds two data fields to the staging table for (i) a "movement ID" field identifying an execution of an assessment engine that copied and scored the records, and (ii) a "record ID" field to uniquely identify the version of the record being scored. In one embodiment, the staging table appears as follows:

| MVMT_ID | RECORD_ID | TICKET_SOURCE_ID | TCKT_NUM | MERCH_BUS_CD |
|---|---|---|---|---|
| 1 | 9 | 1 | "" | 3105 |
| 1 | 10 | 2 | "garbage" | 3092 |
| 1 | 11 | 3 | "503123456789012" | 3047 |
| 1 | 12 | 4 | "123456" | 4511 |

The assessment engine generates a view named "TICKET_VW" to collate (using a "join" clause) the carrier number data field in the reference table with the ticket number data fields in the staging table. The view creates a new column, VERIFIED_CARRIER_NUM, that contains a copy of the carrier number if the first 3 digits of the ticket number match the carrier number, or a null value if the first three digits of the ticket number do not match the carrier number. In one embodiment, the view appears as follows:

| MVMT_ID | RECORD_ID | TICKET_SOURCE_ID | TCKT_NUM | MERCH_BUS_CD | VERFIED_CARRIER_NUM |
|---|---|---|---|---|---|
| 1 | 9 | 1 | "" | 3105 | "" |
| 1 | 10 | 2 | "garbage" | 3092 | "" |
| 1 | 11 | 3 | "503123456789012" | 3047 | 503 |
| 1 | 12 | 4 | "123456" | 4511 | "" |

Once the view is complete, the assessment engine is ready to assess the table name associated with the staging table view. When the data assessment is initiated, the assessment engine builds a list of sources, as described below. For each source, the assessment engine builds a list of data quality assessment criteria based on predefined metadata.

In order to evaluate the above criteria, the assessment engine creates a scored table including a scored table record for the source table being scored. The scored table record identifies the origin of the data being scored (i.e., the source table, TICKET_SOURCE). In one embodiment, the scored table appears as follows:

| SCORED_TBL_ID | SCORED_TBL_NAM |
|---|---|
| 1 | TICKET_SOURCE |

The assessment engine creates an assessment source table including an assessment source record identifying a location in the database that the data to be scored is read. In this case, it is the view TICKET_VW. In other words, the assessment source record in the assessment source table identifies the view TICKET_VW as being the location to collect the data for assessment, and further identifies which fields in the view represent the movement ID and the record ID. In one embodiment, the assessment source table appears as follows:

| SCR_SRC_ID | SCR_SOURCE_TBL_NAM | SCORED_TBL_ID | PK_FLD_NAM | MVMT_ID_FLD_NAM |
|---|---|---|---|---|
| 5 | TICKET_VW | 1 | RECORD_ID | MVMT_ID |

The assessment engine creates a scored field table including a record identifying a data field that is being scored (i.e., the ticket number or TCKT_NUM). In other words, the record in the scored field table identifies the data field (TCKT_NUM) in the source table to receive a score. In one embodiment, the scored field table appears as follows:

| SCORED_FLD_ID | SCORED_TBL_ID | SCORED_FLD_NAM |
|---|---|---|
| 7 | 1 | TCKT_NUM |

The assessment engine creates a scored point table including point records for the possible points to be awarded to the data fields being scored. The three point records represent the three points that could be assigned to the ticket number data field. These records declare points available but do not specify how the points are awarded. In one embodiment, the scored point table appears as follows:

| SCORED_PT_ID | SCORED_FLD_ID | POINT_LBL |
|---|---|---|
| 12 | 7 | "Presence Point" |
| 13 | 7 | "Bonus Point" |
| 14 | 7 | "Alternate Bonus Point" |

The assessment engine creates an assessment rule table including assessment rule records that can be applied to data fields. The assessment rule records represent the structure of each comparison that will be made in the data, where each structure or rule was predefined by a user in the metadata. Each assessment rule, when applied to a specific data field in an assessment criteria, evaluates as either true or false. All criteria tied to a specific point must be true for the point to be awarded. In one embodiment, the assessment rule table appears as follows:

| ASSESSING_RULE_ID | EVALUATED_OPER | EVALUATED_LITERAL | RULE_NOTE |
|---|---|---|---|
| 20 | RX | $* | Field is populated |
| 21 | GE | 3000 | Field value is greater than or equal to 3000 |
| 22 | LE | 3299 | Field value is less than or equal to 3299 |
| 23 | RX | ^\d{13, 15}[[:space]]*$ | Field is 13 to 15 digits with optional trailing spaces |
| 24 | RX | ^\d{6}[[:space]]*$ | Field is at least 6 digits with optional trailing spaces |
| 25 | EQ | 4511 | Field value equals 4511 |

The assessment engine creates an assessment criteria table including assessment criteria records describing the predefined data quality assessment criteria. The assessment criteria records identify the combinations of rules and source fields associated with each possible point that can be awarded. More particularly, each assessment criteria record combines a point (i.e., SCORED_POINT_ID), a rule (i.e., SCR_RULE_ID), and a source (i.e., ASSESSING_SOURCE_ID and EVALUATED_SOURCE_FLD) to describe the predefined data quality assessment criteria that must be true for the point to be awarded. Each predefined data quality assessment criteria includes an identification number (i.e., SCORED_POINT_CRTR_ID). In one embodiment, the assessment criteria table appears as follows:

| SCORED_POINT_CRTR_ID | ASSESSING_SOURCE_ID | EVALUATED_SOURCE_FLD | SCORED_POINT_ID | SCR_RULE_ID | CRITERIA_NOTE |
|---|---|---|---|---|---|
| 50 | 5 | TCKT_NUM | 12 | 20 | "Presence Point: TICKET_SOURCE.TCKT_NUM, TCKT_NUM Field is populated" |
| 51 | 5 | MERCH_BUS_CD | 13 | 21 | "Bonus Point: TICKET_SOURCE.TCKT_NUM, MERCH_BUS_CD Field value is greater than or equal to 3000" |
| 52 | 5 | MERCH_BUS_CD | 13 | 22 | "Bonus Point: TICKET_SOURCE.TCKT_NUM, MERCH_BUS_CD Field value is less than or equal to 3299" |

-continued

| SCORED_POINT_CRTR_ID | ASSESSING_SOURCE_ID | EVALUATED_SOURCE_FLD | SCORED_POINT_ID | SCR_RULE_ID | CRITERIA_NOTE |
|---|---|---|---|---|---|
| 53 | 5 | VERIFIED_CARRIER_NUM | 13 | 20 | "Bonus Point: TICKET_SOURCE.TCKT_NUM, VERIFIED_CARRIER_NUM Field value is populated" |
| 54 | 5 | TCKT_NUM | 13 | 23 | "Bonus Point: TICKET_SOURCE.TCKT_NUM, TCKT_NUM Field is 13 to 15 digits with optional trailing spaces" |
| 55 | 5 | TCKT_NUM | 14 | 24 | "Alternate Bonus Point: TICKET_SOURCE.TCKT_NUM, TCKT_NUM Field is at least 6 digits with optional trailing spaces" |
| 56 | 5 | MERCH_BUS_CD | 14 | 25 | "Alternate Bonus Point: TICKET_SOURCE.TCKT_NUM, MERCH_BUS_CD Field value equals 4511" |

When this is complete, the assessment engine will execute and award (for example, via load queries) zero, one, or two points to each ticket number data field. The assessment engine writes records to three output tables indicating (i) which criteria "passed" for each data record, (ii) the total number of points awarded to each data field, and (iii) the total number of points awarded to each data record.

In some embodiments, the scored table, assessment source table, scored field table, scored point table, and/or assessment rule table are configured to remain "static" after generation, allowing concurrent read operations. As used herein, "static" refers to tables that may remain unmodified after being generated by the assessment engine. For example, in a QA computing device configured with multiple processing cores, different processing cores may simultaneously read access the same assessment rule. Updating a row in a database table may cause a portion of the stored data to become "locked" and/or inaccessible while the update operation is pending. Processing time may be reduced when data records are being scored by the assessment engine, as the QA computing device may not need to check whether a write operation is pending to these "static" tables and/or if the data is locked.

Upon execution, the assessment engine generates the following data in a scored criteria results table. This is an enumeration of which criteria were met by which records. The SCORED_REC_PK_VAL field is the record ID for each record and the SCORED_POINT_CRTR_ID is identification of the predefined data quality assessment criteria that was met. In one embodiment, the scored criteria results table appears as follows:

| MVMT_ID | SCORED_REC_PK_VAL | SCORED_POINT_CRTR_ID |
|---|---|---|
| 1 | 10 | 50 |
| 1 | 11 | 50 |
| 1 | 12 | 50 |
| 1 | 9 | 51 |
| 1 | 9 | 52 |
| 1 | 10 | 51 |
| 1 | 10 | 52 |
| 1 | 11 | 51 |
| 1 | 11 | 52 |
| 1 | 11 | 53 |
| 1 | 11 | 54 |
| 1 | 12 | 55 |
| 1 | 12 | 56 |

In this embodiment, the stored criteria results table is independent from the staging table and source table. This allows the staging and source tables to be "static", and thus allowing concurrent read operations, while the assessment engine is assessing data records. This may decrease processing time, as write operation locking and lock checking may be avoided. Further, data storage efficiency may be increased, as unnecessary data duplication is avoided. In other systems, quality results may be stored with the source data, increasing database complexity and assessment processing time.

In some embodiments, the scored criteria result table is configured to be transactional and/or atomic, such that, while assessment scores are being generated for data records, only new table records are created. In one embodiment, this is accomplished through uniquely identifying rows by the data quality assessment criteria and source record columns. Updating a row in a database table may cause a portion of the stored data to become "locked" and/or inaccessible while the update operation is pending. Only new records will be created, independent of each other, and may be recorded in any order. Again, this lack of interdependency reduces processing time. In other systems, rows may be created based on scored data records with independent columns for the data quality assessment criteria, such that storing the results of an assessment necessitates a row update operation, increasing processing time.

The assessment engine creates a scored field result table including points awarded to data fields where all criteria for a point have been met by the value in the field. In one embodiment, the scored field result table appears as follows:

| MVMT_ID | SCORED_REC_PK_VAL | SCORED_FLD_ID | SCORE |
|---|---|---|---|
| 1 | 10 | 7 | 1 |
| 1 | 11 | 7 | 2 |
| 1 | 12 | 7 | 2 |

Finally the assessment engine sums the data field assessments for each data record and records them in the scored record result table. Records and fields omitted from the results are assumed to have scored zero points. In one embodiment, the scored record result table appears as follows:

| MVMT_ID | SCORED_REC_PK_VAL | SCORED_TABLE_ID | SCORE |
|---|---|---|---|
| 1 | 10 | 1 | 1 |
| 1 | 11 | 1 | 2 |
| 1 | 12 | 1 | 2 |

In the example embodiment, only one data field was scored for the four records (i.e., records 9, 10, 11, and 12; however, records 9 is not included in the scored record result table and the scored field result table because the data field was null). However, in other embodiments, there could be many data fields scored for each record, each with its own unique list of possible points to be awarded, and lists of criteria for each of those possible points.

The methods and systems described herein may be implemented using computer programming or engineering techniques including computer software, firmware, hardware or any combination or subset thereof, wherein the technical effect is achieved by performing at least one of: (a) receiving source data including a source table, (b) copying a table structure of the source table into a new staging table definition, (c) adding two columns to the staging table for a movement ID and a record ID, (d) creating one or more views of the staging table, (e) creating point records for possible points to be awarded to data fields being scored, (f) creating assessment rules that can be applied to the data fields, (g) creating data quality assessment criteria, (h) awarding points to each data field based on the data quality assessment criteria, and (i) summing the data field points for each data record.

The systems and methods described herein provide at least the technical advantage(s) of: (a) increasing data quality, (b) preventing malicious data, (c) increasing data storage by preventing bad data quality, (d) providing increased flexibility in data processing options to accommodate a wider variety of clients, (e) reducing hardware and infrastructure costs, (f) allowing the quality of data records to be assessed in parallel, (g) reducing the processing time to determine the quality of a large data set; (h) scoring data fields and data records to identify comparative data quality of different sets of data from different time periods and/or sources to, for example, identify problems; and (i) judging a quality of data records to determine whether the data records are fit for specific business purposes.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of The Open Group). The application is flexible and designed to run in various different environments without compromising any major functionality. In some embodiments, the system includes multiple components distributed among a plurality of computing devices, such as in a computing cluster environment. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to assessing data quality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a simplified block diagram of an example system 100 for assessing data quality of data records. In the example embodiment, system 100 includes a quality assessment (QA) computing device 110 configured to assess the quality of the data records as described above. QA computing device 110 includes a data modeler 111, an assessment engine 112, and a data warehouse 120. In some embodiments, data modeler 111 and/or assessment engine 112 is located within data warehouse 120.

In the example embodiment, client systems 114 is a network of computing devices configured to provide data records to QA computing device 110. For example, at least one of client systems 114 may include a computer system associated with an issuer of a transaction card, a merchant bank, or a merchant. In addition, client systems 114 may include point-of-sale (POS) devices associated with a merchant and used for processing payment transactions. In another embodiment, client systems 114 are computing devices enabling a user to define a multitude of metadata. Using client systems 114, one or more users enter the metadata into a series of tables. The tables are then transmitted to QA computing device 110 through a network. In still another embodiment, client systems 114 is one or more computer devices associated with a financial transaction interchange network and/or a payment network. In some embodiments, QA computer device 110 may be associated with, or is part of the interchange network and/or the payment network. QA computer device 110 may be used for assessing data quality of transaction records.

Client systems 114 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client systems 114 can be any device capable of accessing the Internet including, but not limited to, a desktop computer, a laptop computer, a personal digital assistant (PDA), a cellular phone, a smartphone, a tablet, a phablet, or other web-based connectable equipment.

A database server 116 is communicatively coupled to a data warehouse 120 that stores data, including data records. In one embodiment, the data records stored in data warehouse 120 have already been scored by QA computing device 110. In another embodiment, the data records stored in data warehouse 120 are waiting to be scored by QA computing device 110. In still another embodiment, data warehouse 120 stores both scored and un-scored data records. In an alternative embodiment, data warehouse 120 is stored remotely from QA computer device 110. In some embodiments, data warehouse 120 is decentralized and capable of handling multiple simultaneous read requests.

Figure 2:
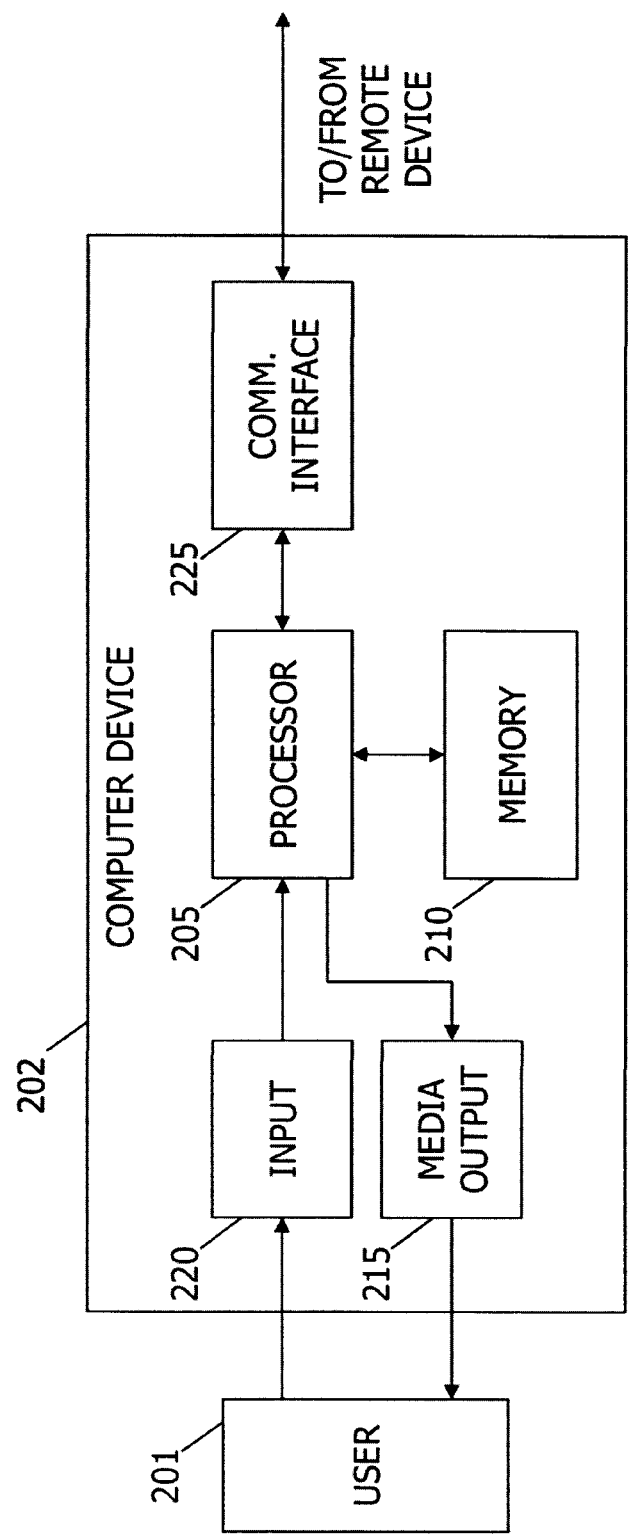

FIG. 2 illustrates an example configuration of a computing device 202 of client system 114 shown in FIG. 1, in accordance with one embodiment of the present disclosure. Computing device 202 is operated by a user 201. Computing device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or transaction data to be stored and retrieved. Memory area 210 may include one or more computer-readable media.

Computing device 202 also includes at least one media output component 215 for presenting information to user 201. Media output component 215 is any component capable of conveying information to user 201. In some embodiments, media output component 215 includes an output adapter (not shown) such as a video adapter and/or an audio adapter. An output adapter is operatively coupled to processor 205 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 215 is configured to present a graphical user interface (e.g., a web browser and/or a client application) to user 201. In some embodiments, computing device 202 includes an input device 220 for receiving input from user 201. User 201 may use input device 220 to, without limitation, enter metadata as described above. Input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 215 and input device 220.

Computer device 202 may also include a communication interface 225, communicatively coupled to a remote device such as QA computing device 110 (shown in FIG. 1). Communication interface 225 may include, for example, a wired or wireless network adapter and/or a wireless data transceiver for use with a mobile telecommunications network.

Stored in memory area 210 are, for example, computer-readable instructions for providing a user interface to user 201 via media output component 215 and, optionally, receiving and processing input from input device 220. The user interface may include, among other possibilities, a web browser and/or a client application. Web browsers enable users, such as user 201, to display and interact with media and other information typically embedded on a web page or a website.

Figure 3:
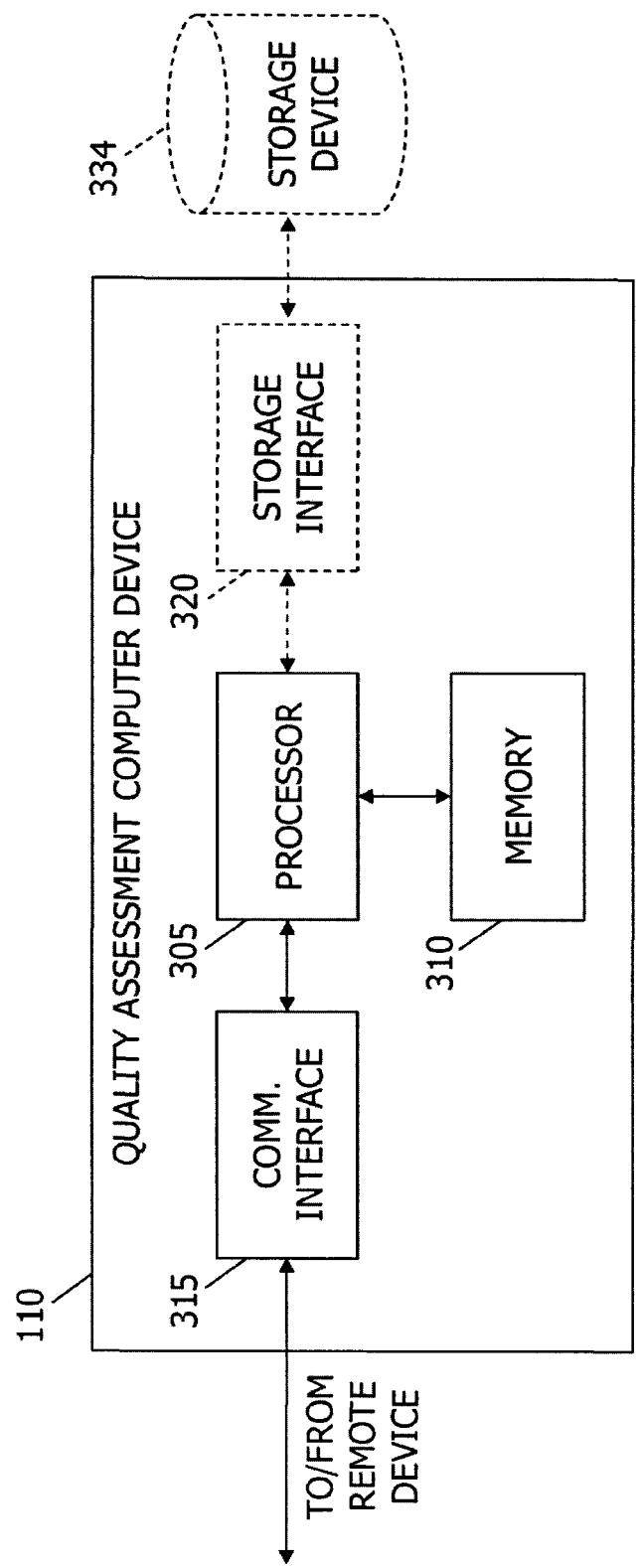

FIG. 3 illustrates an example configuration of a QA computing device 110 shown in FIG. 1, in accordance with one embodiment of the present disclosure. QA computing device 110 may include, but is not limited to, database server 116 (shown in FIG. 1). QA computing device 110 also includes a processor 305 for executing instructions. Instructions may be stored in a memory area 310. Processor 305 may include one or more processing units (e.g., in a multi-core configuration).

Processor 305 is operatively coupled to a communication interface 315 such that QA computing device 110 is capable of communicating with a remote device such as another QA computing device 110 or client systems 114 (shown in FIG. 1). For example, communication interface 315 may receive data records from client systems 114 via the Internet.

Processor 305 may also be operatively coupled to a storage device 334. Storage device 334 is any computer-operated hardware suitable for storing and/or retrieving data, such as, but not limited to, data associated with data warehouse 120 (shown in FIG. 1). In some embodiments, storage device 334 is integrated in QA computing device 110. For example, QA computing device 110 may include one or more hard disk drives as storage device 334. In other embodiments, storage device 334 is external to QA computing device 110 and may be accessed by a plurality of QA computing devices 110. For example, storage device 334 may include a storage area network (SAN), a network attached storage (NAS) system, and/or multiple storage units such as hard disks and/or solid state disks in a redundant array of inexpensive disks (RAID) configuration.

In some embodiments, processor 305 is operatively coupled to storage device 334 via a storage interface 320. Storage interface 320 is any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Processor 305 executes computer-executable instructions for implementing aspects of the disclosure. In some embodiments, processor 305 is transformed into a special purpose microprocessor by executing computer-executable instructions or by otherwise being programmed. For example, processor 305 is programmed with the instructions to create the database tables as described above.

Figure 4:
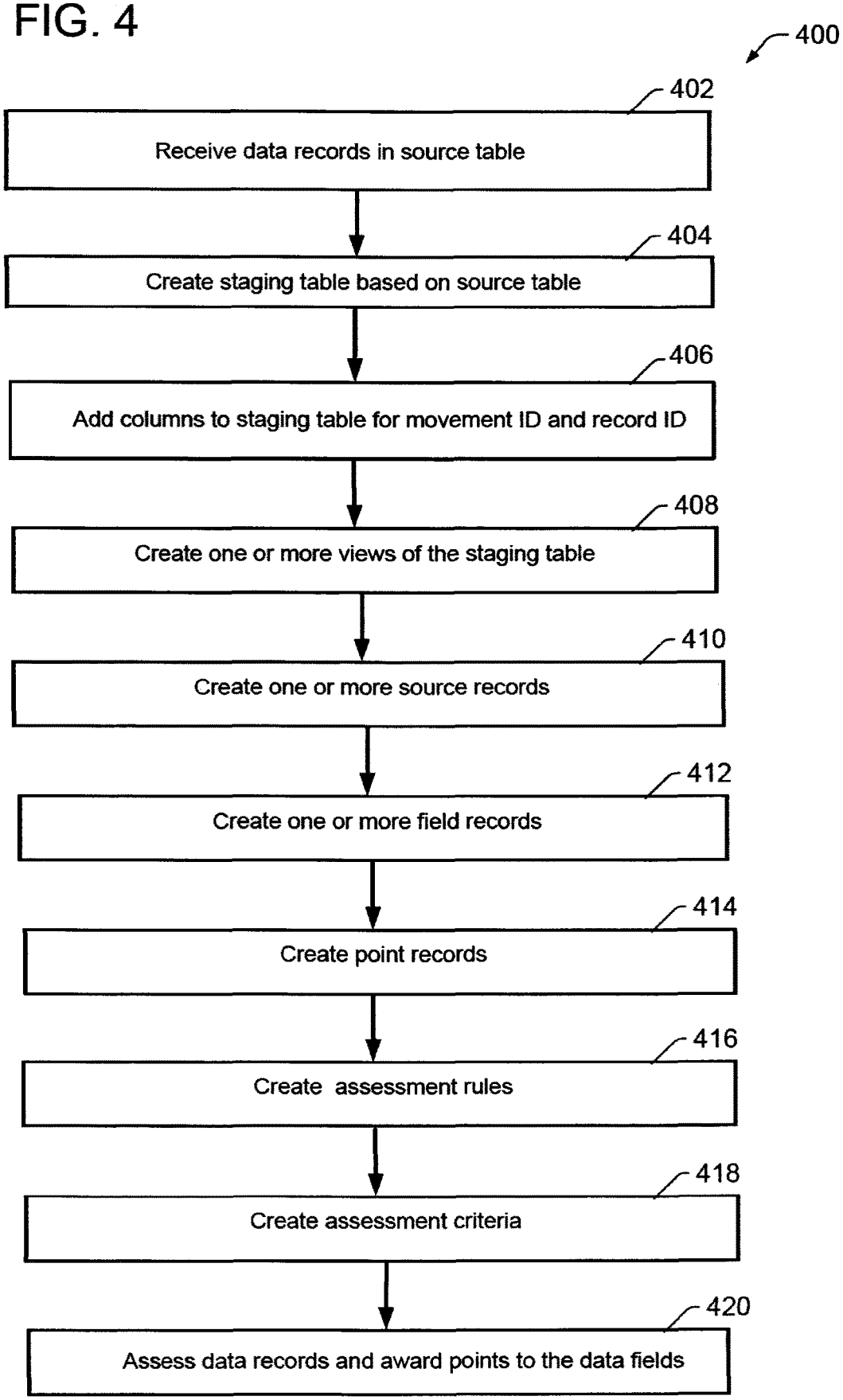

FIG. 4 is a data flow diagram illustrating a method 400 for assessing data records received from a remote client device (e.g., client systems 114, shown in FIG. 1). The QA computing device receives 402 data records from an entity, such as a merchant or vendor. The data records are included within a source table. The QA computing device copies 404 a table structure of the source table into a new staging table.

The QA computing device adds 406 two columns to the staging table for the movement ID and the record ID.

The QA computing device creates 408 one or more views of the staging table. The QA computing device creates 410 one or more source records identifying where in a database the data fields to be scored are read. The QA computing device creates 412 one or more field records for the data fields that are being scored. The QA computing device creates point records 414 for all the possible points that could be awarded to the data field being scored. The QA computing device creates 416 assessment rules that can be applied to the data fields. The QA computing device creates 418 data quality assessment criteria. The QA computing device awards, in step 420, points to each data field in the source whenever QA computing device is executed.

Figure 5:
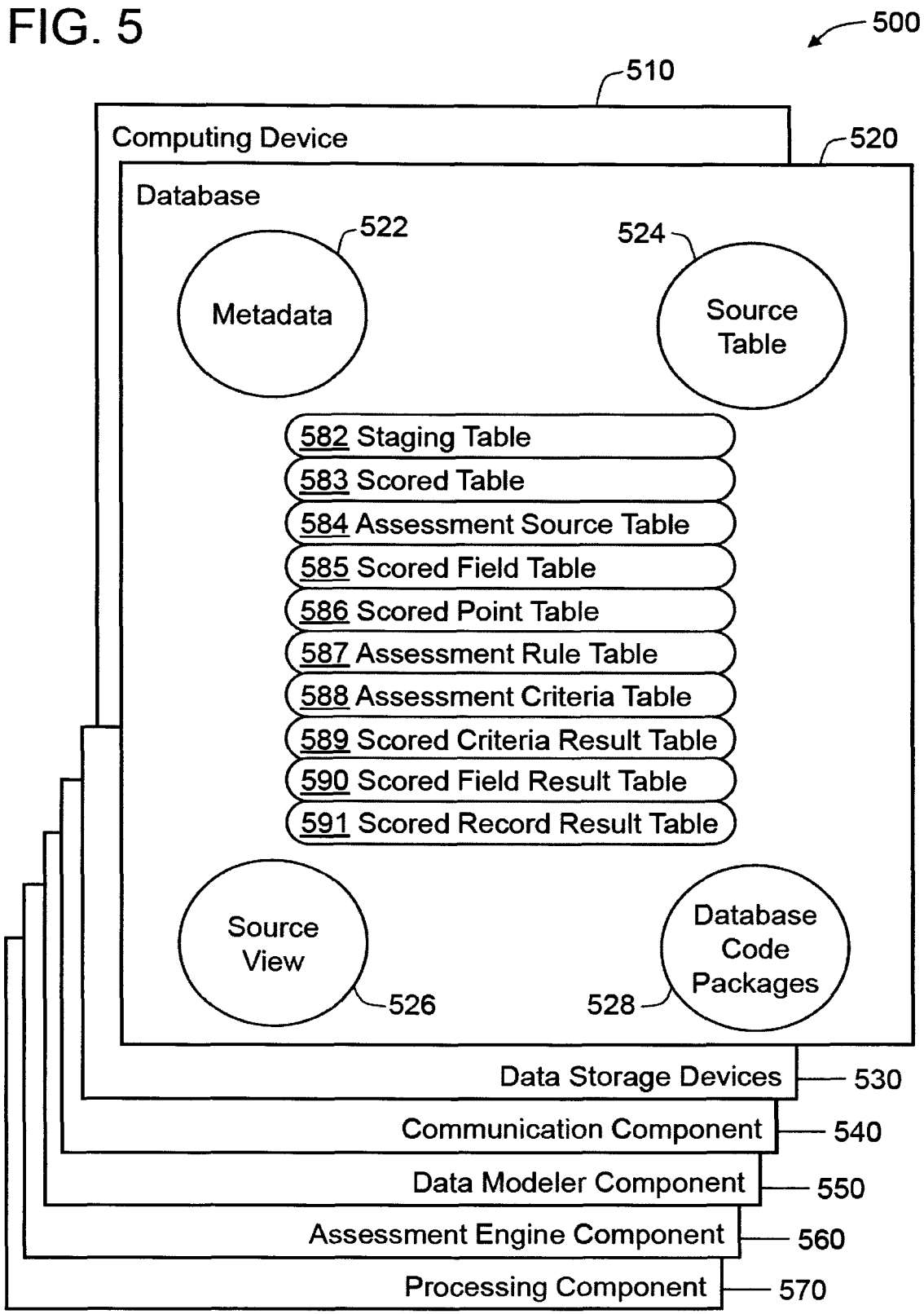

FIG. 5 is a diagram 500 of components of one or more example computing devices that may be used in system 100 shown in FIG. 1. In some embodiments, computing device 510 is QA computing device 110 (shown in FIG. 1). Database 520 may be coupled with several separate components within computing device 510, which perform specific tasks. In this embodiment, database 520 includes metadata 522, one or more database code packages 524, assessed data records 526, and/or unassessed data records 528. In some embodiments, database 520 is similar to data warehouse 120 (shown in FIG. 1).

Computing device 510 includes database 520, as well as data storage devices 530. Computing device 510 also includes a communication component 540 for, but not limited to, receiving metadata and/or data records. Computing device 510 also includes a data modeler component 550 and an assessment engine component 560 (shown in FIG. 1). A processing component 570 assists with execution of computer-executable instructions associated with the system.

As will be appreciated based on the foregoing specification, the above-described examples of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed examples of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communications network or link. The article of manufacture containing the computer code may be made and/or used by executing the code directly from one medium, by copying the code from one medium to another medium, or by transmitting the code over a network.

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

For example, one or more computer-readable storage media may include computer-executable instructions embodied thereon for determining the probability of an authorized transaction resulting in a chargeback. In this example, the computing device may include a memory device and a processor in communication with the memory device, and when executed by said processor the computer-executable instructions may cause the processor to perform a method such as the method described and illustrated in the example of FIG. 4.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A quality assessment (QA) computing device for assessing data quality of one or more data records identified by predefined metadata, the QA computing device comprising one or more processors, an assessment engine, and a data warehouse, the QA computing device configured to:
    retrieve the one or more data records from the data warehouse, wherein each of the one or more data records includes one or more data fields;
    create one or more views of a staging table, wherein the one or more views include the one or more data records;
    generate, by the assessment engine, predefined data quality assessment criteria from the predefined metadata;
    assess, by the assessment engine, the data quality of the one or more data fields by applying the predefined data quality assessment criteria; and
    assign, by the assessment engine, a data quality value to at least one of the one or more data fields based on the assessed data quality.

2. The QA computing device of claim 1 further configured to
    generate the staging table including the one or more data records.

3. The QA computing device of claim 1 further configured to assess the data quality of the one or more data fields by performing at least one of (i) applying in parallel at least two assessment criteria to a single data record stored within the staging table, and (ii) independently assessing in parallel at least two data records stored within the staging table, thereby reducing an overall processing time of the QA computing device.

4. The QA computing device of claim 1, wherein the one or more views of the staging table are created using a join clause with reference model data.

5. The QA computing device of claim 1 further configured to retrieve a source table including the one or more data records.

6. The QA computing device of claim 1, wherein the predefined metadata identifies points to be awarded based on a scoring of the one or more data records.

7. The QA computing device of claim 1 further configured to aggregate data quality values assigned to a first data field of each of the one or more data fields to determine a total data quality assessment score for the first data field.

8. A computer-implemented method for assessing data quality of one or more data records identified by predefined metadata, the method implemented by a quality assessment (QA) computing device including one or more processors, an assessment engine, and a data warehouse, the method comprising:
retrieving the one or more data records from the data warehouse, wherein each of the one or more data records includes one or more data fields;
creating one or more views of a staging table, wherein the one or more views include the one or more data records;
generating, by the assessment engine, predefined data quality assessment criteria from the predefined metadata;
assessing, by the assessment engine, the data quality of the one or more data fields by applying the predefined data quality assessment criteria; and
assigning, by the assessment engine, a data quality value to at least one of the one or more data fields based on the assessed data quality.

9. The method of claim 8 further comprising
generating the staging table including the one or more data records.

10. The method of claim 8 further comprising assessing the data quality of the one or more data fields by performing at least one of (i) applying in parallel at least two assessment criteria to a single data record stored within the staging table, and (ii) independently assessing in parallel at least two data records stored within the staging table, thereby reducing an overall processing time of the QA computing device.

11. The method of claim 8, wherein the one or more views of the staging table are created using a join clause with reference model data.

12. The method of claim 8, wherein retrieving the one or more data records comprises a source table including the one or more data records.

13. The method of claim 8, wherein the predefined metadata identifies points to be awarded based on a scoring of the one or more data records.

14. The method of claim 8 further comprising aggregating data quality values assigned to a first data field of each of the one or more data fields to determine a total data quality assessment score for the first data field.

15. A non-transitory computer readable storage media having computer-executable instructions embodied thereon, when executed by at least one processor, the computer-executable instructions cause the at least one processor to:
retrieve one or more data records from a data warehouse, wherein the one or more data records are identified by predefined metadata, and wherein each of the one or more data records includes one or more data fields;
create one or more views of a staging table, wherein the one or more views include the one or more data records;
generate, by an assessment engine, predefined data quality assessment criteria from the predefined metadata;
assess, by the assessment engine, data quality of the one or more data fields by applying the predefined data quality assessment criteria; and
assign, by the assessment engine, a data quality value to at least one of the one or more data fields based on the assessed data quality.

16. The computer-readable storage media in accordance with claim 15, wherein the computer-executable instructions further cause the at least one processor to
generate the staging table including the one or more data records.

17. The computer-readable storage media in accordance with claim 15, wherein the computer-executable instructions further cause the at least one processor to assess the data quality of the one or more data fields by performing at least one of (i) applying in parallel at least two assessment criteria to a single data record stored within the staging table, and (ii) independently assessing in parallel at least two data records stored within the staging table.

18. The computer-readable storage media in accordance with claim 15, wherein the one or more views of the staging table are created using a join clause with reference model data.

19. The computer-readable storage media in accordance with claim 15, wherein the computer-executable instructions further cause the at least one processor to retrieve a source table including the one or more data records.

20. The computer-readable storage media in accordance with claim 15, wherein the predefined metadata identifies points to be awarded based on a scoring of the one or more data records.

* * * * *